Oct. 22, 1935.  C. E. L. DAPPRICH  2,018,253
MOTOR CONTROL SYSTEM
Filed Feb. 23, 1933  2 Sheets-Sheet 1

WITNESSES:
C. J. Weller
Paul E. Friedemann

INVENTOR
Carl E. Dapprich.
BY W. R. Coley
ATTORNEY

Oct. 22, 1935.     C. E. L. DAPPRICH     2,018,253
MOTOR CONTROL SYSTEM
Filed Feb. 23, 1933     2 Sheets-Sheet 2

WITNESSES:
C. J. Weller.
Paul E. Friedemann

INVENTOR
Carl E. Dapprich.
BY W. R. Coley
ATTORNEY

Patented Oct. 22, 1935

2,018,253

UNITED STATES PATENT OFFICE 2,018,253

MOTOR CONTROL SYSTEM

Carl E. L. Dapprich, Edgewood, Pa., assignor to Westinghouse Electric & Manufacturing Company, East Pittsburgh, Pa., a corporation of Pennsylvania Application February 23, 1933, Serial No. 658,039

10 Claims. (Cl. 172—274)

My invention relates to means for controlling the operation of a plurality of wound rotor inductor motors.

Numerous applications arise in industry where a group of alternating current motors are required to operate at substantially identical speeds, that is, not necessarily at synchronous speed with reference to the alternating current supply for the motors, but at some lower speed. Heretofore in the art synchronous motors have been utilized for such industrial demands. However, synchronous motor installations are expensive and must necessarily operate at synchronous speed, and, further, are not well adapted to speed variations which are to be the same for a plurality of motors.

One object of my invention is to provide for maintaining a plurality of wound rotor induction motors substantially in synchronism with each other.

A further object of my invention is to provide interconnections between corresponding windings of a plurality of motors to be kept in synchronism with each other, whereby the motors automatically hold themselves at a common speed for the entire number.

A still further object of my invention is to provide corrective winding sections in induction motors, which have small mutual induction with the working winding and a high self-induction, by positioning the corrective sections of the windings of the respective motors in the lower portion of the slot and separated from the working winding by magnetic bridges.

Other objects and advantages will become apparent from a study of the following specification, when taken in conjunction with the accompanying drawings, in which.

Figure 1:
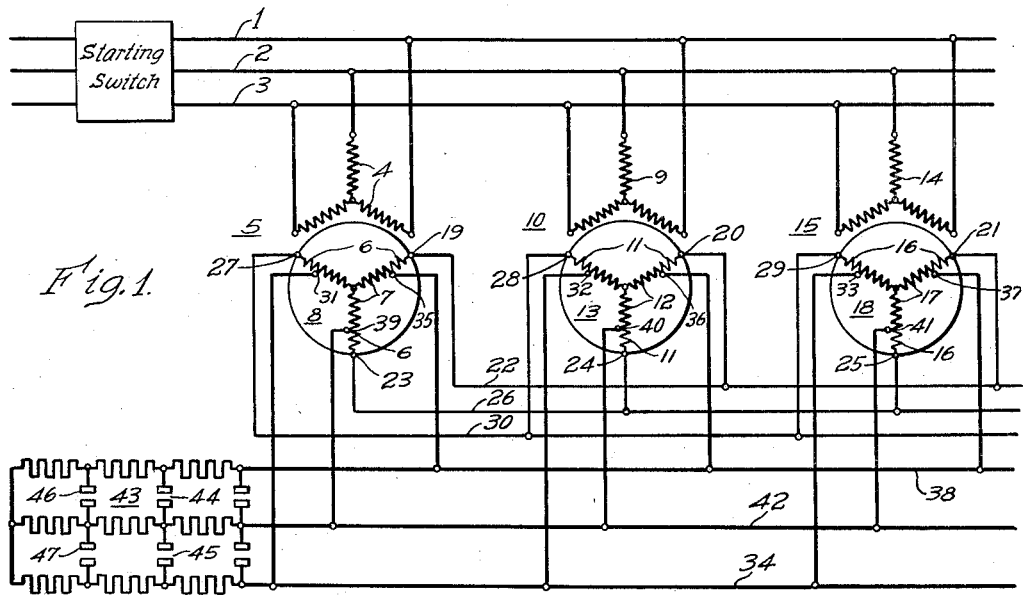
Figure 1 shows three wound rotor induction motors provided with my invention.

Referring more particularly to Fig. 1 of the drawings, "Starting switch" designates the conventional motor starter, including the necessary circuit breakers, whereas buses 1, 2 and 3 designate the leads for supplying electrical energy to the stators 4, 9 and 14 of the wound rotor induction motors 5, 10 and 15. Although these motors are shown in the same line, it should be noted that no mechanical interconnection is shown, and, in fact, in an actual installation these motors may be quite remote from each other having only the electrical interconnections hereinafter explained more in detail.

Each of the motors 5, 10 and 15 has rotors 8, 13 and 18, respectively, and these rotors are provided with working windings 7, 12 and 17, respectively, and speed corrective windings 6, 11 and 16, respectively, the main or working windings of the respective motors having corresponding junctions, or, as in this case, slip rings 31, 32 and 33, 35, 36 and 37, 39, 40 and 41 connected to the respective conductors 34, 38 and 42. These last-named conductors are merely the leads which interconnect the secondary windings or rotors to the common control rheostat 43 having the switches 44, 45, 46 and 47 for varying the speed and torque of all of the motors simultaneously. It is, of course, understood that a common rheostat is not an essential, but that independent rheostats may be utilized for each of the secondary windings of the motors. However, to facilitate the solving of the problem herein presented, it would in such case be desirable to have the independent rheostats mechanically interlocked so that corresponding resistor sections would be short circuited for each motor for a single movement of the rheostat arm.

The speed corrective windings 6, 11 and 16 of the motors 5, 10 and 15, respectively, have corresponding junctions, or, as in this case, slip rings 19, 20 and 21, 23, 24 and 25, 27, 28 and 29 connected to common conductors 22, 26 and 30. Since corresponding slip rings of the rotors of the induction motors for the corrective windings are connected to the same conductor, no torque will be produced by the speed corrective windings when all of the rotors of the induction motors are operating at the same speed, regardless of the slip there may be with reference to the frequency of the current supplied to the primary or stator windings 4, 9 and 14, respectively. However, when any one of the three motors lags behind any one of the other motors, circulating currents will be produced in the speed corrective windings through the common conductors 22, 26 and 30, and the torque produced in the motor, which is not at the proper speed, will be in such a direction as to accelerate or decelerate, as the case may be, that motor to bring it to the speed of the remaining motors. It is thus obvious that the speed corrective windings automatically maintain all of the motors at the same speed, even though there may be some difference in the load each motor is called upon to operate.

Figure 2:
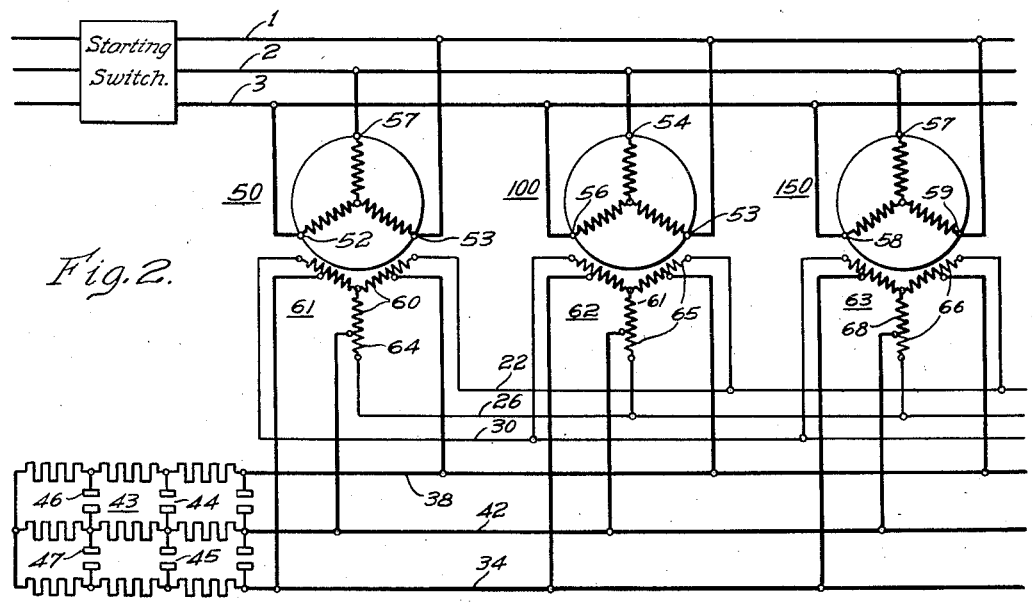
Fig. 2 shows a similar arangement as is shown in Fig. 1, except that the secondary windings of the induction motors are disposed in the stationary members of the motors.

In some applications, it may be found disadvantageous to use the arrangement shown in Fig. 1, which of necessity requires the use of six slip rings on the rotor or secondary winding of each induction motor. Accordingly, the modification shown in Fig. 2 shows the buses 1, 2 and 3 connected to the rotor windings through the slip rings 51, 54 and 57, 53, 55 and 59, 52, 56 and 58 of the respective motors 50, 100 and 150. It is thus obvious that only three slip rings are necessary for each motor. The secondary windings 61, 62 and 63 are provided with the speed corrective windings 64, 65 and 66, respectively, and these windings, by suitable junctions, are connected to the respective conductors 22, 26 and 30. The working secondary windings 66, 67 and 68 are connected to the conductors 38, 42 and 34 and the rheostat 43.

It is, of course, obvious that where the motors are substantially identical in design, and drive loads which are substantially equal, the corrective torques need only be small, and in consequence the correcting winding need be only a small portion or fraction of the winding of the entire secondary for each motor, whereas if the loads on the motors are considerably different, and particularly where the size of the motors are not the same, the corrective portion of the winding may be large relative to the secondary. It will be noted that my invention requires no additional resistors in the control scheme, and in consequence the efficiency of the system is high.

Figure 3:
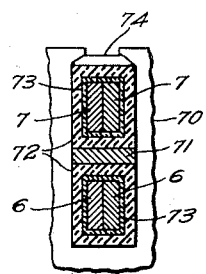
Fig. 3 shows a cross-section of the portion of the motor provided with the working winding and the speed corrective winding.

For the circuit arrangement shown if the effective resistance in the working section of the secondary winding is varied, or even short circuited, the corrective section is also short circuited. To thus not lose or impair the effective operation or control action of the corrective section of the secondary winding, it is desirable to dispose the corrective winding in the lower portion of the slots so that the mutual induction of the windings may be a minimum. Further, to decrease the mutual induction between the windings, a magnetic bridge 71 coacting with the laminations 70, may be disposed between the working winding 7 and the corrective winding 6, as is shown in Fig. 3. It should be noted that, by thus positioning the corrective winding 6 in the lower portion of the slot and in addition providing the magnetic bridge 71, the self-induction is made high. Both of these conditions, that is, a low mutual inductance and a high self-inductance, are thus attained by the arrangement shown in Fig. 3, and both of these effects improve the corrective action of the speed corrective winding 6, even though the effective resistance in the working winding may be varied over a considerable range by the rheostat 43.

Figure 4:
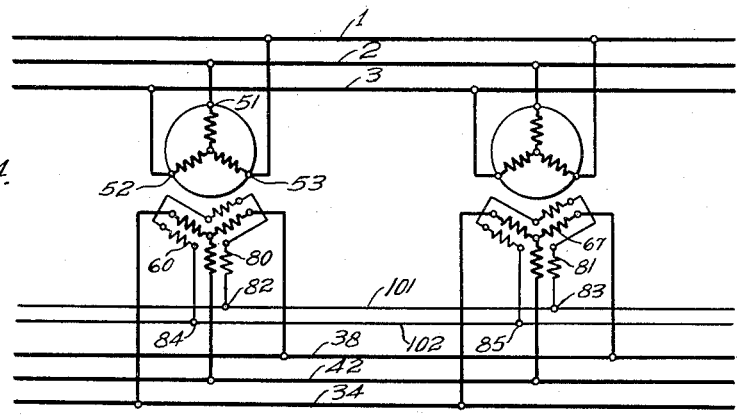
Figs. 4, 5 and 6 are diagrammatic showings of still further modifications of my invention.

It will be noted that in Fig. 4, the armature windings of the respective motors are connected to the buses 1, 2 and 3 in the same manner as is shown in Fig. 2 and insofar as the same elements are utilized, the reference characters are chosen alike. It should, however, be noticed that the corrective windings 80 and 81 in this modification are not electrically interconnected with the working windings 60 and 67, but represent independent windings for each motor; are disposed in the bottom of the slot of the stator, as shown in Fig. 3; and are single phase windings. Each single phase winding has corresponding junctions 82 and 83, and 84 and 85 connected to the buses 101 and 102, respectively. Since the corrective windings in each machine are connected in series in the same sense, no circulating current will flow in these corrective windings when the rotors of the two machines rotate at the same speed with the reference to the frequency of the current supplied to the machines.

Figure 5:
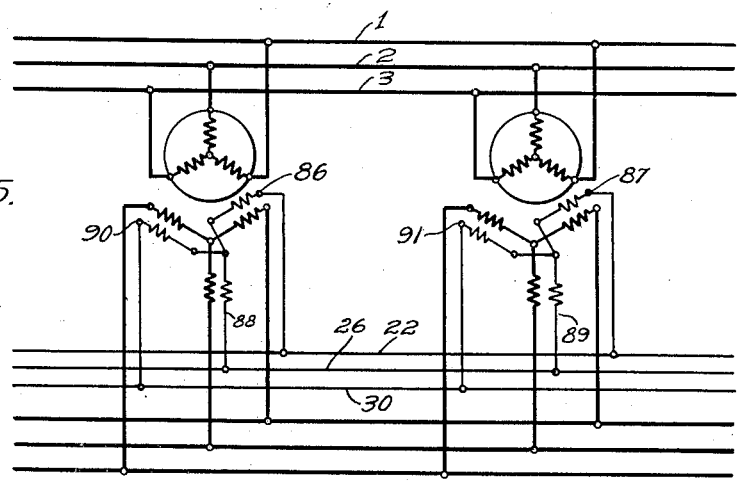

The modification shown in Fig. 5 is in all respects similar to the modification shown in Fig. 4, except that for this modification the corrective winding is again not conductively related to the working winding but is connected in Y circuit relation for each machine. Corresponding junctions 86 and 87, and 88 and 89, and 90 and 91 of the Y connected corrective windings are connected to the buses 22, 26 and 30.

Figure 6:
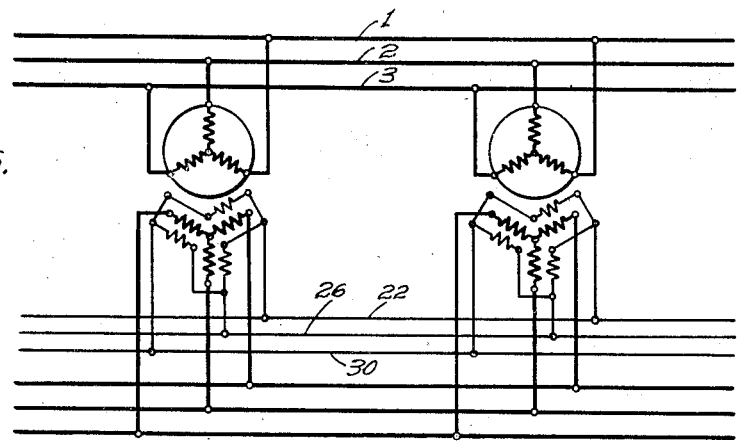

In the modification shown in Fig. 6, the corrective winding is shown connected in delta circuit relation and has corresponding junctions also connected to the buses 22, 26 and 30.

I am, of course, aware of the fact that my invention, particularly for those skilled in the art after they have had the benefit of the teachings of my invention, may be embodied in still different modifications but I wish to be limited only by the pertinent prior art and the appended claims and not to the specific arrangements shown and described.

I claim as my invention:

1. In a system of control for a plurality of wound-rotor induction motors all supplied with alternating current from the same source of supply, a speed corrective winding for each motor disposed in the bottom of the slots of each motor, magnetic bridges disposed in the slots of each motor above the speed corrective windings, working windings in the top of the slots of each motor, means for varying the effective resistances of the working windings to control the operation of the motors, and circuit connections for interconnecting corresponding points of the re-respective speed corrective windings.

2. In a system of control for a plurality of wound-rotor induction motors all supplied with alternating current from the same source of supply, each of said motors having a primary winding and a pair of secondary windings, said secondary windings comprising a working winding and a speed corrective winding, and means for connecting corresponding points of the speed corrective winding of all the motors to common junctions.

3. In a control system for a pair of alternating current induction motors of the wound-rotor type, each motor having a pair of secondary windings disposed in slots, one of said windings being disposed in the bottom of the winding slots and the other of said windings being disposed in the top of the winding slots, and means for interconnecting corresponding points of the winding in the bottom of the slots of the two motors to maintain the speeds of the two motors the same.

4. A wound-rotor induction motor having a secondary winding, a comparatively large part of the winding being connected to a control resistor and the remaining relatively small portion being mounted on the motor to be subject to but a small inductive effect from the large part of the winding and having a large self-inductive effect, in combination with another motor similar in every respect to the first-named motor and means for connecting corresponding points of the small portions of the windings to common junctions.

5. In a system of control for $n$ wound-rotor induction motors where $n$ is any integer other than one, each motor having a primary winding, connecting circuits for connecting all the primary windings to the same source of alternating current, each motor having secondary windings comprising a working winding having speed control means interconnected therewith, and a speed corrective winding, said speed corrective winding having circuits connecting corresponding points of the speed corrective winding to common junctions.

6. In a system of control for $n$ wound-rotor induction motors, where $n$ is any integer other than one, each motor having a primary winding, connecting means for connecting the primary windings to the same source of alternating current, each motor having a secondary winding including a speed corrective winding disposed in the bottom of the slots for the secondary winding, a working winding disposed in the top of the slots for the secondary winding, and speed control means for the working winding only, and means for connecting corresponding points of the speed corrective winding to common junctions.

7. In a control system for a pair of alternating-current induction motors of the wound rotor type, each having a pair of independently connected secondary windings, one of said windings, for each motor, being disposed in the bottom of the winding slots, and the other being disposed in the top of the winding slots, and means for interconnecting corresponding points of the windings in the bottom of the slots of the two motors to maintain the speeds of the two motors the same.

8. In a system of control for a plurality of wound-rotor induction motors all supplied with alternating current from the same source of supply, each of said motors having a primary winding and two independently connected secondary windings, said secondary windings embodying a working winding and a speed corrective winding, respectively, and means for connecting corresponding points of the speed corrective winding of all the motors to common junctions.

9. In a system of control for $n$ wound-rotor induction motors, where $n$ is any integer other than one, each motor having primary windings, connecting circuits for connecting all the primary windings to the same source of alternating current, each motor having a pair of independently connected secondary windings comprising working windings and speed corrective windings, respectively, and means for connecting corresponding points of the speed corrective windings to common junctions.

10. In a system of control for $n$ wound-rotor induction motors, where $n$ is any integer other than one, each motor having a primary winding, a source of alternating-current energy, connecting circuits for connecting all of said primary windings to said source of alternating-current energy, each motor having a pair of independently connected secondary windings comprising respectively, working windings and speed corrective windings, said working windings being disposed in the top of the winding slots and said speed corrective windings being disposed in the bottom of the winding slots, speed control means for the working windings, and means for connecting corresponding points of the speed corrective windings to common junctions.

CARL E. L. DAPPRICH.